US007107207B2

(12) United States Patent
Goodman

(10) Patent No.: US 7,107,207 B2
(45) Date of Patent: Sep. 12, 2006

(54) TRAINING MACHINE LEARNING BY SEQUENTIAL CONDITIONAL GENERALIZED ITERATIVE SCALING

(75) Inventor: Joshua Theodore Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 10/175,430

(22) Filed: Jun. 19, 2002

(65) Prior Publication Data

US 2003/0236662 A1    Dec. 25, 2003

(51) Int. Cl.
G06F 17/28    (2006.01)
(52) U.S. Cl. ............................. 704/9; 704/240; 704/243; 704/257
(58) Field of Classification Search ............... None
See application file for complete search history.

(56) References Cited

U.S. PATENT DOCUMENTS

| | | | |
|---|---|---|---|
| 5,510,981 A | | 4/1996 | Berger et al. |
| 5,640,487 A | | 6/1997 | Lau et al. |
| 6,304,841 B1 | | 10/2001 | Berger et al. |
| 6,314,399 B1 | | 11/2001 | Deligne et al. |
| 6,697,769 B1 | * | 2/2004 | Goodman et al. ............ 703/2 |
| 2001/0003174 A1 | * | 6/2001 | Peters ........................ 704/240 |

OTHER PUBLICATIONS

"Inducing Features of Random Fields"; Stephen Della Pietra, et al; IEEE Transactions Pattern Analysis and Machine Intelligence, vol. 19, No. 4, Apr. 1997, pp. 1-13.

"A Maximum Entropy Approach to Natural Language Processing"; Adam L. Berger, et al.; IBM T.J. Watson Research Center; Computational Linguistics, vol. 22, No. 1; pp. 1-36.

"Classes for Fast Maximum Entropy Training"; Joshua Goodman; Microsoft Research.

Logistic Regression, AdaBoost and Bregman Distances; Michael Collins, et al.; Proceedings of the Thirteenth Annual Conference on Computational Learning Theory, 2000, Oct. 11, 2000; pp. 1-26.

Frederick Jelinek; "Statistical Methods for Speech Recognition"; pp. 1-283.

M. Branko, et al.; "Mitigating the Paucity of Data Problem; Exploring the Effect of Training Corpus Size on Classifier Performance for Natural Language Processing"; 2001; 5 Pages.

David T. Brown; "A Note on Approximations to Discrete Probability Distributions"; Information and Control 2, 386-392 (1959).

(Continued)

Primary Examiner—Donald L. Storm
(74) Attorney, Agent, or Firm—Amin & Turocy, LLP

(57) ABSTRACT

A system and method facilitating training machine learning systems utilizing sequential conditional generalized iterative scaling is provided. The invention includes an expected value update component that modifies an expected value based, at least in part, upon a feature function of an input vector and an output value, a sum of lambda variable and a normalization variable. The invention further includes an error calculator that calculates an error based, at least in part, upon the expected value and an observed value. The invention also includes a parameter update component that modifies a trainable parameter based, at least in part, upon the error. A variable update component that updates at least one of the sum of lambda variable and the normalization variable based, at least in part, upon the error is also provided.

20 Claims, 10 Drawing Sheets

OTHER PUBLICATIONS

Stanley F. Chen; "A Gaussian Prior for Smoothing Maximum Entropy Models"; Technical Report CMU-CS-99-108; Computer Science Department, Carnegie Mellon University; Feb. 1999; pp. 1-23.

J. N. Darroch, et al.; "Generalized Iterative Scaling for Log-Linear Models"; The Annals of Mathematical Statistics, 43, No. 5; pp. 1470-1480.

John Lafferty, et al.; "Conditional Random Fields: Probabilistic Models for Segmenting and Labeling Sequence Data"; School of Computer Science, Carnegie Mellon University, 8 Pages.

John D. Lafferty; "Gibbs-Markov Models"; In Computing Science and Statistics: Proceedings of the 27th Symposium on the Interface; 8 Pages.

Thomas P. Minka; "Algorithms for Maximum-Likelihood Logistic Regression"; Oct. 2001; Availabe from http://www-white.media.mit.edu/tprninka/papers/learning.html, Apr.; pp. 1-15.

Adwait Ratnaparkhi; "Maximum Entropy Models for Natural Language Ambiguity Resolution"; Ph.D. Thesis, University of Pennsylvania; 1998;pp. 1-147.

Jeffrey C. Reynar, et al.; "A Maximum Entropy Approach to Identifying Sentence Boundaries"; Department of Computer and Information Science; University of Pennsylvania; 1997; 4 Pages.

Ronald Rosenfeld; "Adaptive Statistical Language Modeling: A Maximum Entropy Approach"; Apr. 19, 1994; Ph.D. Thesis; Carnegie Mellon University.

Jun Wu, et al.; "Efficient Training Methods for Maximum Entropy Language Modeling"; 2000; In IC-SLP, vol. 3, pp. 114-117.

Joshua Goodman, Sequential Conditional Generalized Iterative Scaling, Proceedings of the 40th Annual Meeting of the ACL, Jul. 2002, pp. 9-16.

* cited by examiner

TRAINING MACHINE LEARNING BY SEQUENTIAL CONDITIONAL GENERALIZED ITERATIVE SCALING

TECHNICAL FIELD

The present invention relates generally to machine learning, and more particularly to a system and method employing sequential conditional generalized iterative scaling for training machine learning system(s), especially systems using so-called maximum entropy models, logistic regression, or perceptrons trained to minimize entropy.

BACKGROUND OF THE INVENTION

Machine learning is a general term that describes automatically setting the parameters of a system so that the system operates better. One common use for machine learning is the training of parameters for a system that predicts the behavior of objects or the relationship between objects. An example of such a system is a language model used to predict the likelihood of a sequence of words in a language.

One problem with current machine learning is that it can require a great deal of time to train a single system. In particular, systems that utilize Maximum Entropy techniques to describe the probability of some event tend to have long training times, especially if the number of different features that the system uses is large.

Conditional Maximum Entropy models have been used for a variety of natural language tasks, including Language Modeling, part-of-speech tagging, prepositional phrase attachment, parsing, word selection for machine translation, and finding sentence boundaries. Unfortunately, although maximum entropy (maxent) models can be applied very generally, the conventional training algorithm for maxent, Generalized Iterative Scaling (GIS) can be extremely slow.

Discussion of Generalized Iterative Scaling

Conditional maxent probalility models are of the form $$P(y|\bar{x}) = \frac{e^{\sum_j \lambda_j f_j(\bar{x}|y)}}{\sum_{y'} \exp\sum_i \lambda_i f_i(\bar{x}, y')} \quad (1)$$

where $\bar{x}$ is an input vector, y is an output, the $f_i$ are feature functions (indicator functions) that are true if a particular property of $\bar{x}$, y is true, and $\lambda_i$ is a trainable parameter (e.g., weight) for the feature function $f_i$. For example, if trying to do word sense disambiguation for the word "bank", $\bar{x}$ would be the context around an occurrence of the word; y would be a particular sense, e.g., financial or river; $f_i$ ($\bar{x}$, y) could be 1 if the context includes the word "money" and y is the financial sense; and $\lambda_i$ would be a large positive number.

Maxent models have several valuable properties one of which is constraint satisfaction. For a given $f_i$, the number of times $f_i$ was observed in the training data can be determined (observed $$[i] = \sum_j f_i(\bar{x}, y_j)).$$

For a probability model $P_{\bar{\lambda}}$ with parameters $\bar{\lambda}$, the number of times the model predicts $f_i$ can be determined $$\left(\sum_{j,y} P_{\bar{\lambda}}(y|\bar{x}_j)f_i(\bar{x}_j, y)\right).$$

Maxent models have the property that expected [i]=observed [i] for all i. These equalities are called constraints. An additional property of models in the form of Equation (1) is that the maxent model maximizes the probability of the training data. Yet another property is that maxent models are as close as possible to the uniform distribution, subject to constraint satisfaction.

Maximum entropy models are conventionally learned using generalized iterative scaling (GIS). At each iteration, a step is taken in a direction that increases the likelihood of the training data. The step size is determined to be not too large and not too small: the likelihood of the training data increases at each iteration and eventually converges to the global optimum. Unfortunately, this comes at a price: GIS takes a step size inversely proportional to the maximum number of active constraints. Maxent models are interesting precisely because of their ability to combine many different kinds of information, so this weakness of GIS means that maxent models are slow to learn precisely when they are most useful.

Those skilled in the art will recognize that with regard to systems using values such as $$e^{\sum_j \lambda_j f_j(\bar{x}|y)}, \mu_i = e^{\lambda_j} \text{ and } \prod_i \mu_i^{f_j(\bar{x}|y)} = e^{\sum_j \lambda_j f_j(\bar{x}|y)}$$

are equivalent systems—the change from sums of λ values to products of μ values is essentially only a notational change.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system for training a machine learning system that can be used, for example, for a variety of natural language tasks, including Language Modeling, part-of-speech tagging, prepositional phrase attachment, parsing, word selection for machine translation, and finding sentence boundaries. The system is based on employing sequential conditional generalized iterative scaling to train the machine learning system.

In accordance with an aspect of the present invention, the system includes an expected value update component, an error calculator, a parameter update component, a variable update component, a sum of lambda variable store, and a normalization variable store.

The expected value update component can modify an expected value for a plurality of outputs and for a plurality of instances in which a feature function is non-zero, based, at least in part, upon the feature function of an input vector and an output value, a sum of lambda variable and a normalization variable. The error calculator can calculate an error based, at least in part, upon the expected value and an observed value. The parameter update component can modify a trainable parameter based, at least in part, upon the error. The variable update component can update the sum of lambda variable and/or the normalization variable for a plurality of outputs and for a plurality of instances in which a feature function is non-zero, based, at least in part, upon the error. The sum of lambda variable store can store the sum of lambda variables and the normalization variable store can store the normalization variables. The system can sequentially update trainable parameters, for example, for each feature function until the trainable parameters have converged.

Conventionally, maximum entropy (maxent) models are trained using generalized iterative scaling (GIS). At each iteration, a step is taken in a direction that increases the likelihood of the training data. The step size is determined to be not too large and not too small: the likelihood of the training data increases at each iteration and eventually converges to the global optimum.

The system of the present invention employs sequential conditional generalized iterative (SCGIS) scaling to train the machine learning system. Thus, rather than learning substantially all trainable parameters of the model simultaneously, the system learns them sequentially: one, then the next etc., and then back to the beginning. The system can cache subcomputations (e.g., sum of lambda variable and/or normalization variable), for example, to increase speed of the system.

Conventional GIS-based algorithms employ training data stored as a sparse matrix of feature functions with non-zero values for each instance. In accordance with an aspect of the present invention, the sequential conditional generalized iterative scaling of the present invention employs training data stored as a sparse matrix of instances with non-zero values for each feature function.

Yet another aspect of the present invention provides for the system to further include a training data store and a parameter store. The training data store stores input vector(s) and/or the observed value(s). In one example, information is stored in the training data store so as to facilitate efficient transfer of information within the system (e.g., employing suitable caching technique(s)). In a second example, information is stored in the training data store in a sparse representation to facilitate computational speed of the system.

The parameter store stores at least one of the trainable parameters. In one example, information is stored in the parameter store to facilitate efficient transfer of information within the system (e.g., employing suitable caching technique(s)).

In accordance with another aspect of the present invention, the sequential conditional generalized iterative scaling of the present invention can be combined with other technique(s) in order to facilitate machine learning. For example, SCGIS can be employed with word clustering, improved iterative scaling and/or smoothing.

Briefly, the word clustering speedup (which can be applied to problem(s) with many outputs and is not limited to words) works as follows. In both conventional GIS and SCGIS as provided above, there are loops over substantially all outputs, y. Even with certain optimizations that can be applied in practice, the length of these loops is still bounded by, and often can be proportional to, the number of outputs. Word clustering therefore changes from a model of the form $P(y|\bar{x})$ to modeling $P(cluster(y)|\bar{x}) \times P(y|\bar{x}, cluster(y))$.

Consider a language model in which y is a word, the number of outputs is the vocabulary size, and x represents the words preceding y. For example, the vocabulary can have 10,000 words. Then for a model $P(y|\bar{x})$, there are 10,000 outputs. On the other hand, if 100 word clusters are created, each with 100 words per cluster, then for a model $P(cluster(y)|\bar{x})$ ("cluster model"), there are 100 outputs, and for a model $P(y|\bar{x}, cluster(y))$ ("word model") there are also 100 outputs. This means that instead of training one model with a time proportional to 10,000, two models are trained, each with time proportional to 100.

Thus, in this example, there is a 50 times speedup. In practice, the speedups are not quite so large, but speedups of up to a factor of 35 are possible. Although the model form learned is not exactly the same as the original model, the perplexity of the form using two models is actually marginally lower (better) than the perplexity of the form using a single model, so there does not seem to be any disadvantage to using it.

According to an aspect of the present invention, a training system employing sequential conditional generalized iterative scaling for models using word clustering is provided. The training system includes an expected value update component, an error calculator, a parameter update component, a variable update component, a sum of lambda variable store, a normalization variable store, a training data store, trainable class parameters and trainable word parameters.

The trainable class parameters are trained employing sequential conditional generalize iterative scaling as described previously. The trainable word parameters are then likewise trained.

Yet another aspect of the present invention provides for a machine learning system employing parameters trained using sequential conditional generalized iterative scaling.

Other aspects of the present invention provide methods for training a machine learning system, a computer readable medium having computer executable components for a system facilitating training of a machine learning system, and a data packet adapted to be transmitted between two or more computer processes comprising a data field comprising a trained parameter for a machine learning system, the trained parameter having been trained based, at least in part, upon sequential conditional generalized iterative scaling.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
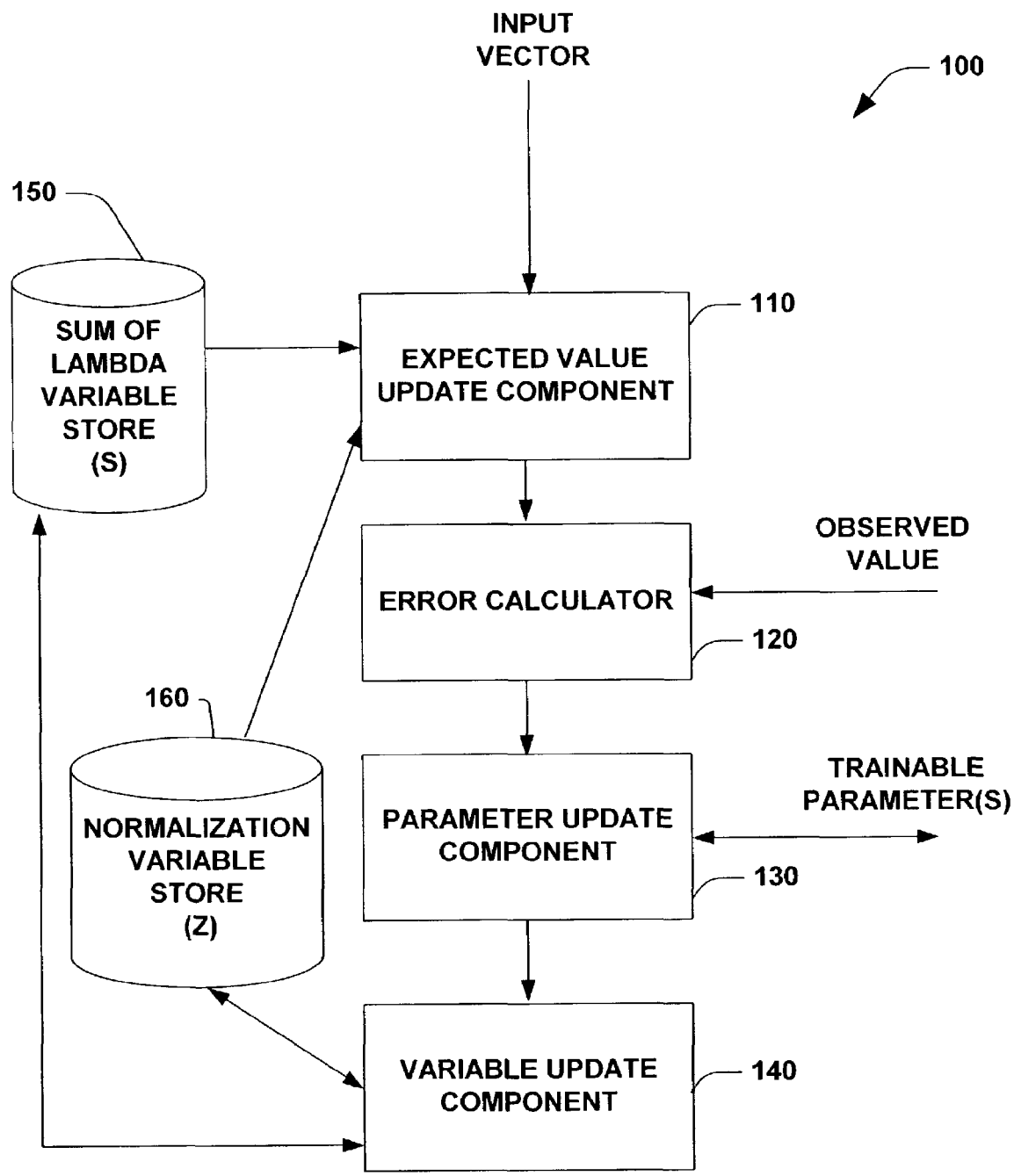
FIG. 1 is a block diagram of a system for training a machine learning system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a system for training a machine learning system 100 in accordance with an aspect of the present invention is illustrated. The system 100 includes an expected value update component 110, an error calculator 120, a parameter update component 130, a variable update component 140, a sum of lambda variable store 150, and a normalization variable store 160.

The system 100 can be utilized to train a machine learning system that can be used, for example, for a variety of natural language tasks, including Language Modeling, part-of-speech tagging, prepositional phrase attachment, parsing, word selection for machine translation, and finding sentence boundaries. The system 100 is based on employing sequential conditional generalized iterative scaling (SCGIS) to train the machine learning system.

As discussed previously, maxent models are conventionally learned using GIS. At each iteration, a step is taken in a direction that increases the likelihood of the training data. The step size is determined to be not too large and not too small: the likelihood of the training data increases at each iteration and eventually converges to the global optimum. Unfortunately, this comes at a price: GIS takes a step size inversely proportional to the maximum number of active constraints. Maxent models are interesting precisely because of their ability to combine many different kinds of information, so this weakness of GIS means that maxent models are slow to learn precisely when they are most useful.

The system 100 employs SCGIS to train the machine learning system. Thus, rather than learning substantially all trainable parameters of the model simultaneously, the system 100 learns them sequentially: one, then the next etc., and then back to the beginning. The system 100 can cache subcomputations, for example, to increase speed of the system 100.

Conventional GIS-based algorithms employ training data stored as a sparse matrix of feature functions with non-zero values for each instance. In accordance with an aspect of the present invention, the sequential conditional generalized iterative scaling of the present invention employs training data stored as a sparse matrix of instances with non-zero values for each feature function.

Additionally, in accordance with another aspect of the present invention, SCGIS utilizes $\max_{j,y} f_i(\bar{x}, y)$. Conventional GIS utilizes an $f^\#$ function defined as: $f^\# = \max_{j,y}$ $$\sum_i f_i(\bar{x}, y).$$

Thus, $f^\#$ of conventional GIS is equal to the largest total value of $f_i$. The $\max_{j,y} f_i(\bar{x}, y)$ of SCGIS can thus provide significant speedup over conventional GIS. Further, in many maxent applications, the $f_i$ take on only the values 0 or 1, and thus, typically $\max_{j,y} f_i(\bar{x}, y)=1$. As such, instead of slowing by a factor of $f^\#$, there may be no significant slowing at all. Further, with SCGIS, instead of updating all $\lambda$'s simultaneously as in conventional GIS, each feature function can be looped over and an update for that feature function can be computed, in turn.

The expected value update component 110 can modify an expected value based, at least in part, upon a feature function of an input vector and an output value, a sum of lambda variable and a normalization variable. In one example, the expected value update component 100 modifies the expected value based, at least in part, upon the following equation:

$$\text{expected value} = \text{expected value} + f_i(\bar{x}_j, y) e^{s[j,y]} / z[j] \qquad (2)$$

where $f_i(\bar{x}_j, y)$ is the feature function, $\bar{x}_j$ is the input vector, y is the output, s[j,y] is the sum of lambda variable, and, z[j] is the normalization variable.

Figure 2:
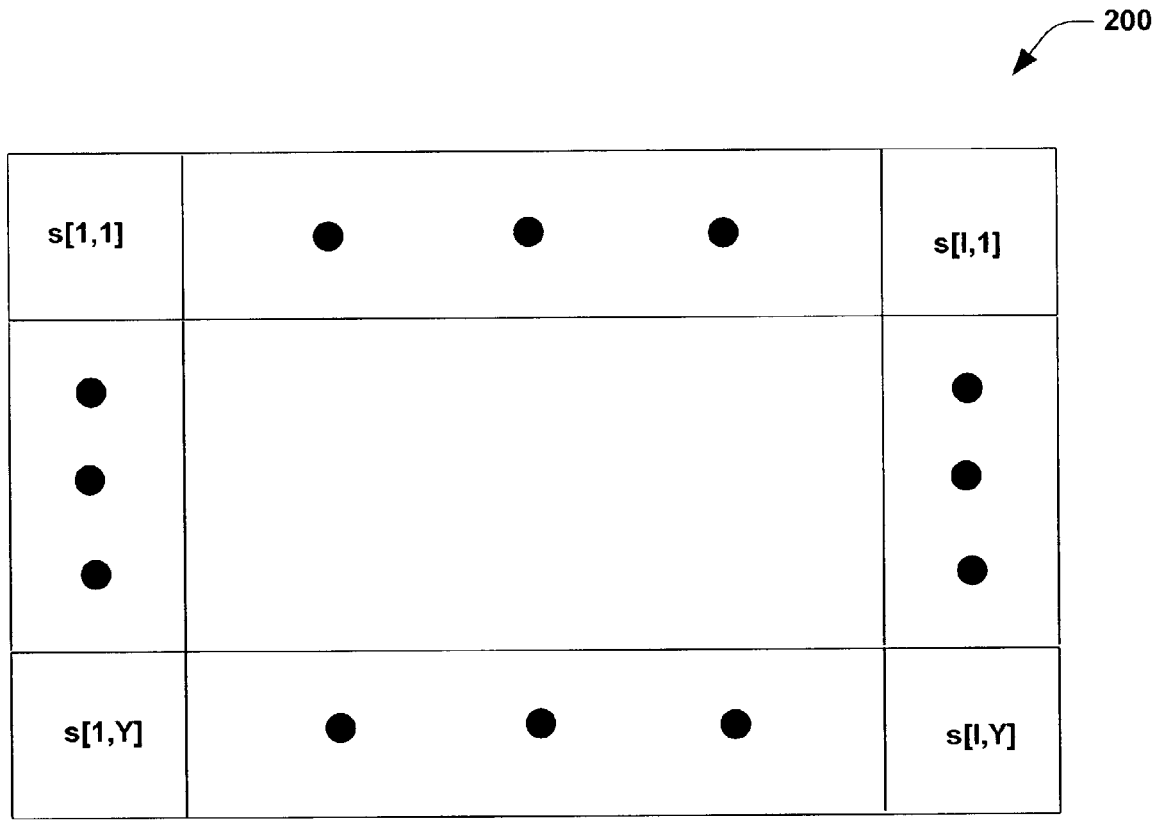
FIG. 2 is an exemplary data structure in accordance with an aspect of the present invention.

Turning briefly to FIG. 2, an exemplary data structure 200 in accordance with an aspect of the present invention is illustrated. The data structure 200 includes Y number of rows and I number of columns, where Y is the number of output classes (values for y), I is the number of training instances. For example, the data structure 200 can be utilized to store information associated with the sum of lambda variable.

Figure 3:
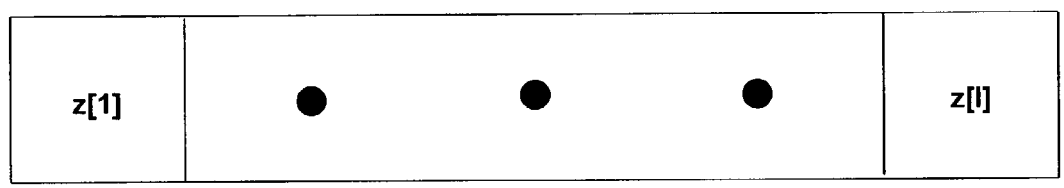
FIG. 3 is an exemplary data structure in accordance with an aspect of the present invention.

Next, referring briefly to FIG. 3, an exemplary data structure 300 in accordance with an aspect of the present invention is illustrated. The data structure 300 includes I number of elements, where I is the number of training instances. For example, the data structure 300 can be utilized to store information associated with the normalization variable.

The data structures 200, 300 are merely exemplary and it is to be appreciated that numerous other structures are contemplated that provide for organizing and/or storing a plurality of data types conducive to facilitating the training of machine learning system(s) in connection with the subject invention. Any such data structure suitable for employment in connection with the present invention is intended to fall within the scope of the appended claims. Such data structures can be stored in computer readable media including, but not limited to, memories, disks and carrier waves.

Turning back to FIG. 1, the error calculator 120 can calculate an error based, at least in part, upon the expected value and an observed value. In one example, the error is based, at least in part, upon the following equation:

$$\delta_i = \frac{1}{\max_{j,v} f_i(\overline{x}_j, y)} \log(\text{observed value}[i]/\text{expected value}[i]) \qquad (3)$$

where $f_i(\overline{x}_j, y)$ is the feature function, $\overline{x}_j$ is the input vector, and, y is the output.

The parameter update component 130 can modify a trainable parameter based, at least in part, upon the error. In one example, modification of the trainable parameter is based, at least in part, upon the following equation:

$$\lambda_i = \lambda_i + \delta_i \qquad (4)$$

where $\lambda_i$ is the trainable parameter, and, $\delta_i$ is the error. Thus, in accordance with an aspect of the present invention, each $\lambda_i$ is updated immediately after expected[i] is computed, rather than after expected values for all features have been computed as done with conventional GIS.

The variable update component 140 can update the sum of lambda variable and/or the normalization variable based, at least in part, upon the error. In one example, updating of the sum of lambda variable and the normalization variable is based, at least in part, upon the following equations:

$$z[j]=z[j]-e^{s[j,y]} \qquad (5)$$

$$s[j,y]=s[j,y]+\delta_i \qquad (6)$$

$$z[j]=z[j]+e^{s[j,y]} \qquad (7)$$

where s[j,y] is the sum of lambda variable, z[j] is the normalization variable, and, $\delta_i$ is the error. Thus, rather than recomputing for each instance j and each output y, $$s[j, y] = \sum_i \lambda_i \times f_i(\overline{x}_j, y)$$

and the corresponding normalizing factors $$z = \sum_v e^{s[j,v]},$$

these arrays can be computed and stored as invariants, and incrementally updated whenever a $\lambda_i$ changes. This can lead to a substantial speed up of the system 100.

The system 100 can sequentially update trainable parameters ($\lambda_i$), for example, for each feature function. Pseudo-code for implementing SCGIS in accordance with an aspect of the present invention follows:

TABLE 1 z[1..I] = Y
s[1..I, 1..Y] = 0
for each iteration
    for each feature function $f_i$
        expected value = 0;
        for each output y for each instance j such that $f_i(\overline{x}_j, y) \neq 0$ expected value = expected value + $f_i(\overline{x}_j, y) e^{s[j,v]}/z[j]$ $$\delta_i = \frac{1}{\max_{j,v} f_i(\overline{x}_j, y)} \log(\text{observed value}[i]/\text{expected value}[i]);$$

$\lambda_i = \lambda_i + \delta_i;$
        for each output y for each instance j such that $f_i(\overline{x}_j, y) \neq 0$
            z[j]=z[j]−$e^{s[j,v]}$
            s[j,y]=s[j,y]+$\delta_i$
            z[j]=z[j]+$e^{s[j,y]}$ where s[ ] is the sum of lambda variable, z[ ] is the normalization variable, Y is the number of output classes (values for y), I is the number of training instances, and, i indexes the feature functions.

In order to demonstrate the advantages of SCGIS over conventional GIS, the time for each algorithm to execute one iteration can be compared. Pseudo-code for conventional GIS follows:

TABLE 2 for each iteration
    expected value[0..I]=0;
    for each training instance j
        for each output y
            s[j,y]:=0;
            for each i such that $f_i(\overline{x}_j, y) \neq 0$
                s[j,y]=s[j,y]+$\lambda_1 \times f_i(\overline{x}_j, y)$ $$z := \sum_y e^{s[j,v]}$$

for each output y
            for each i such that $f_i(\overline{x}_j, y) \neq 0$
                expected value[i]=expected value[i]+$f_i(\overline{x}_j, y) \times e^{s[j,v]}/z$
    for each $$\delta_i = \frac{1}{f^\#} \log(\text{observed value}[i]/\text{expected value}[i])$$

$$\lambda_i = \lambda_i + \delta_i$$

Assume that for every instance and output there is at least one non-zero indicator function, which is generally true in practice. Referring to Table 2, for GIS the top loops end up iterating over all non-zero indicator functions (e.g., feature functions), for each output, for each training instance. In other words, they examine every entry in the training matrix T once, and thus require time proportional to the size of T. The bottom loops simply require time F, the number of indicator functions, which is smaller than T. Thus, GIS require time O(T).

Referring to Table 1, for SCGIS, the top loops are also over each non-zero entry in the training data, which take time O(T). The bottom loops also require time O(T). Thus, one iteration of SCGIS takes about as long as one iteration of GIS. However, the speed up of SCGIS comes from the step size: the update in GIS is slowed by $f^\#$, while the update in SCGIS is not. Thus, SCGIS can converge by up to a factor of $f^\#$ faster than GIS. For many applications, $f^\#$ can be large.

The sum of lambda variable store 150 can store the sum of lambda variables. The normalization variable store 160 can store the normalization variables.

Those skilled in the art will appreciate that sequential conditional generalized iterative scaling of the present invention can be employed with maximum entropy models, logistic regression and/or perceptrons trained to minimize entropy.

While FIG. 1 is a block diagram illustrating components for the system 100, it is to be appreciated that the expected value update component 110, the error calculator 120, the parameter update component 130 and/or the variable update component 140 can be implemented as one or more computer components, as that term is defined herein. Thus, it is to be appreciated that computer executable components operable to implement the system 100, the expected value update component 110, the error calculator 120, the parameter update component 130 and/or the variable update component 140 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 4:
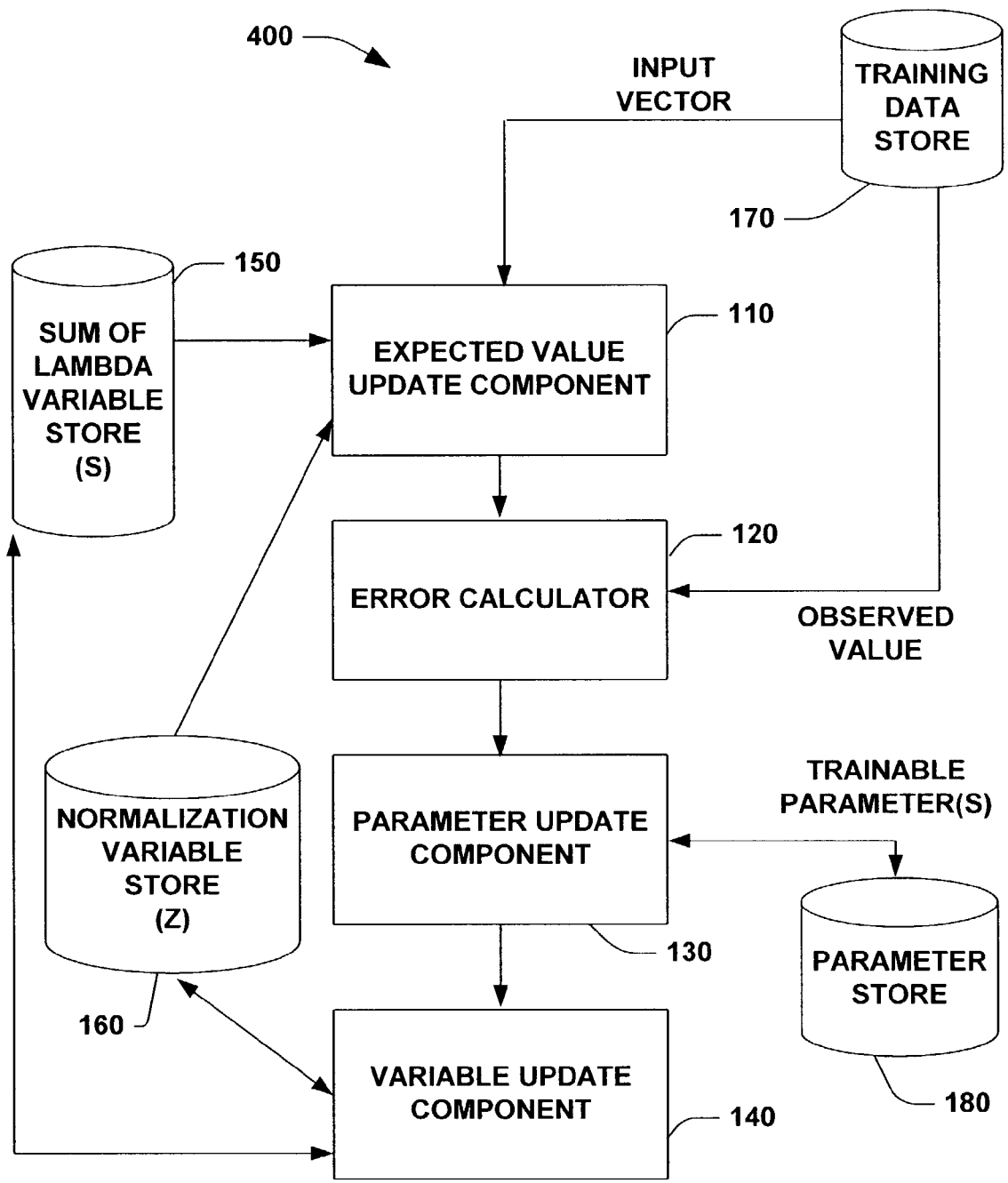
FIG. 4 is a block diagram of a system for training a machine learning system in accordance with an aspect of the present invention.
Figure 5:
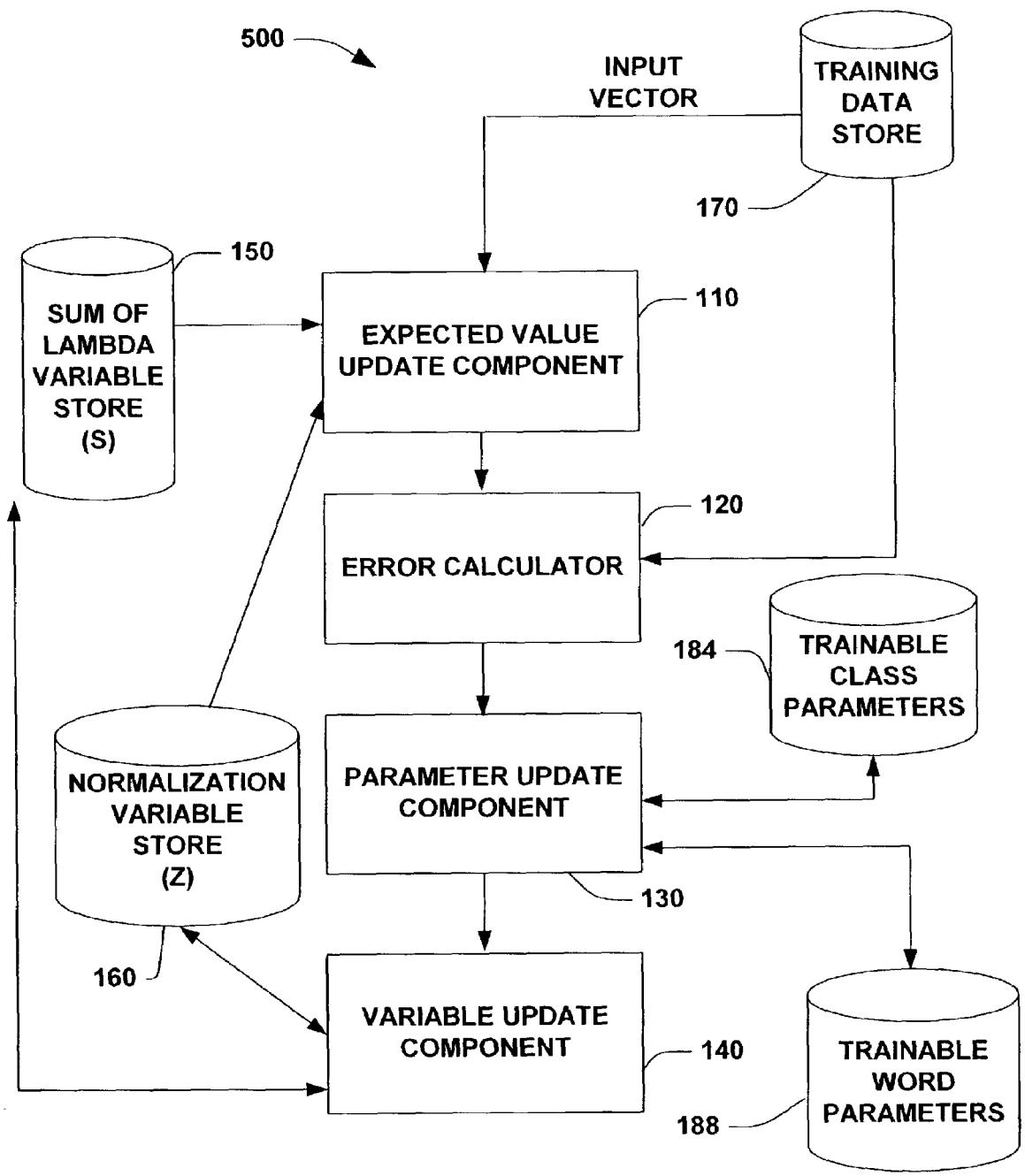
FIG. 5 is a block diagram of a machine learning system in accordance with an aspect of the present invention.

Turning to FIG. 4, a system for training a machine learning system 400 in accordance with an aspect of the present invention is illustrated. The system 400 includes an expected value update component 110, an error calculator 120, a parameter update component 130, a variable update component 140, a sum of lambda variable store 150, a normalization variable store 160, a training data store 170 and a parameter store 180.

The system 400 can be utilized to train a machine learning system that can be used, for example, for a variety of natural language tasks, including Language Modeling, part-of-speech tagging, prepositional phrase attachment, parsing, word selection for machine translation, and finding sentence boundaries. The system 400 is based on employing sequential conditional generalized iterative scaling to train the machine learning system as discussed previously.

The training data store 170 stores input vector(s) and/or the observed value(s). In one example, information is stored in the training data store 170 so as to facilitate efficient transfer of information within the system 400 (e.g., employing suitable caching technique(s)). In a second example, information is stored in the training data store 170 in a sparse representation to facilitate computational speed of the system 400. It is to be appreciated that information can be stored in the training data store 170 in any suitable data structure including, but not limited to, databases, tables, records, arrays and lists.

The parameter store 180 stores at least one of the trainable parameters. In one example, information is stored in the parameter store 180 so as to facilitate efficient transfer of information within the system 400 (e.g., employing suitable caching technique(s)). It is to be appreciated that information can be stored in the parameter store in any suitable data structure including, but not limited to, databases, tables, records, arrays and lists.

In accordance with an aspect of the present invention, the sequential conditional generalize iterative scaling of the present invention can be combined with other technique(s) in order to facilitate machine learning. For example, word clustering, improved iterative scaling and/or smoothing.

Word clustering is discussed in greater detail in copending U.S. Patent Application entitled METHOD AND APARATUS FOR FAST MACHINE TRAINING, having Ser. No. 09/489,045 filed Jan. 21, 2000, now U.S. Pat. No. 6,697,769, the entirety of which is hereby incorporated by reference. In one example, word clustering can lead to a factor of 35 speedup. Additionally, word clustering can facilitate the use of sequential conditional generalize iterative scaling to be employed on system(s) having a large number of outputs.

Briefly, the word clustering speedup (which can be applied to problem(s) with many outputs and is not limited words) works as follows. In both conventional generalized iterative scaling and sequential conditional generalize iterative scaling as provided above, there are loops over substantially all outputs, y. Even with certain optimizations that can be applied in practice, the length of these loops is still bounded by, and often can be proportional to, the number of outputs. Word clustering therefore changes from a model of the form $P(y|\bar{x})$ to modeling $P(cluster(y)|\bar{x}) \times P(y|\bar{x}, cluster(y))$.

Consider a language model in which y is a word, the number of outputs is the vocabulary size, and x represents the words preceding y. For example, the vocabulary can have 10,000 words. Then for a model $P(y|\bar{x})$, there are 10,000 outputs. On the other hand, 100 word clusters are created, each with 100 words per cluster, then for a model $P(cluster(y)|\bar{x})$ ("cluster model"), there are 100 outputs, and for a model $P(y|\bar{x}, cluster(y))$ ("word model") there are also 100 outputs. This means that instead of training one model with a time proportional to 10,000 two models are trained, each with time proportional to 100.

Thus, in this example, there is a 50 times speedup. In practice, the speedups are not quite so large, but speedups of up to a factor of 35 can be achieved. Although the model form learned is not exactly the same as the original model, the perplexity of the form using two models is actually marginally lower (better) than the perplexity of the form using a single model, so there does not seem to be any disadvantage to using it.

Additionally, SCGIS can be combined with improved iterative scaling (IIS) to achieve significant speedups. With IIS, instead of treating $f^\#$ as a constant, it can be treated as a function of $\bar{x}_j$ and y. In particular, let $$f^\#(\bar{x}, y) = \sum_i f_i(\bar{x}, y).$$

Then, the following equation can be solved numerically for $\delta_i$:

$$\text{observed value}[i] = \sum_{j,y} P_{\bar{x}}(y|\bar{x}_j) \times f_i(\bar{x}_j, y) \times \exp(\delta_i f^\#(\bar{x}_j, y)) \quad (8)$$

Notice that in the special case where $f^\#(\bar{x}, y)$ is a constant $f^\#$, equation (8) reduces to:

$$\delta_i = \log(\text{observed value}[i]/\text{expected value}[i])/f^\# \quad (9)$$

which is used to update trainable parameters ($\lambda_i$s) in conventional GIS. However, for training instances where $f^{\#}(\overline{x}_j, y)$ is $<f^{\#}$, the IIS update can take a proportionately larger step. Thus, IIS can lead to speedups when $f^{\#}(\overline{x}_j, y)$ is substantially less than $f^{\#}$.

IIS can be combined with SCGIS by using an update rule (e.g., for use by the error calculator 12) where one solves the following equation for $\delta_i$:

$$\text{observed value}[i] = \sum_{j,y} P_{\overline{\lambda}}(\overline{x}_j, y) \times f_i(\overline{x}_j, y) \times \exp(\delta_i f_i(\overline{x}_j, y)) \quad (10)$$

For many model types, the $f_i$ takes only the values 1 or 0. In this case, equation (10) reduces to the normal SCGIS update.

Next, SCGIS can be combined with smoothing which can lead to significant speedups. Maximum entropy models are naturally maximally smooth, in the sense that they are as close as possible to uniform, subject to satisfying the constraints. However, in practice, there may be enough constraints that the models are not nearly smooth enough, that is, they overfit the training data. In order to smooth models, a Gaussian prior on the parameters can be assumed. The models no longer satisfy the constraints exactly, but work much better on test data. In particular, instead of attempting to maximize the probability of the training data, they maximize a slightly different objective function, the probability of the training data times the prior probability of the model:

$$\arg\max_{\overline{\lambda}} \prod_{j=1}^{J} P_{\overline{\lambda}}(y_j | \overline{x}_j) P(\overline{\lambda}) \quad (11)$$

where $$P(\overline{\lambda}) = \prod_{i=1}^{I} \frac{1}{\sqrt{2\pi}\,\sigma} e^{-\frac{\lambda_i^2}{2\sigma^2}}.$$

In other words, the probability of the $\lambda$s is a simple normal distribution with 0 mean, and a standard deviation of $\sigma$. For a modified update rule in which to find the updates, one solves for $\delta_i$ in:

$$\text{observed value}[i] = \text{expected value}[i] \times e^{\delta_i f^{\#}} + \frac{\lambda_i + \delta_i}{\sigma^2} \quad (12)$$

SCGIS can be modified in a similar way to use an update rule in which one solves for $\delta_i$ in:

$$\text{observed value}[i] = \text{expected value}[i] \times e^{\delta_i \max_{i,y} f_i(\overline{x}_j, y)} + \frac{\lambda_i + \delta_i}{\sigma^2} \quad (13)$$

In one example, the output values y in the training data are divided into classes. Thereafter, the trainable class parameters 184 are trained employing sequential conditional generalized iterative scaling as described previously. The trainable word parameters 188 are then likewise trained.

The system 500 can be utilized to train a machine learning system that can be used, for example, for a variety of natural language tasks, including Language Modeling, part-of-speech tagging, prepositional phrase attachment, parsing, word selection for machine translation, and finding sentence boundaries. The system 500 is based on sequential conditional generalized iterative scaling employing word clustering to train the machine learning system as discussed previously.

In one example, the output values y in the training data are divided into classes. Thereafter, the trainable class parameters 184 are trained employing sequential conditional generalize iterative scaling as described previously. The trainable word parameters 188 are then likewise trained.

It is to be appreciated that the word clustering technique can be extended to multiple level(s). For example, by putting words into superclusters, such as their part of speech, and clusters, such as semantically similar words of a given part of speech, a three level model can be employed. In another example, the technique can be extended to up to $\log_2 Y$ levels with two outputs per level, meaning that the space requirements are proportional to 2 instead of to the original Y.

Figure 6:
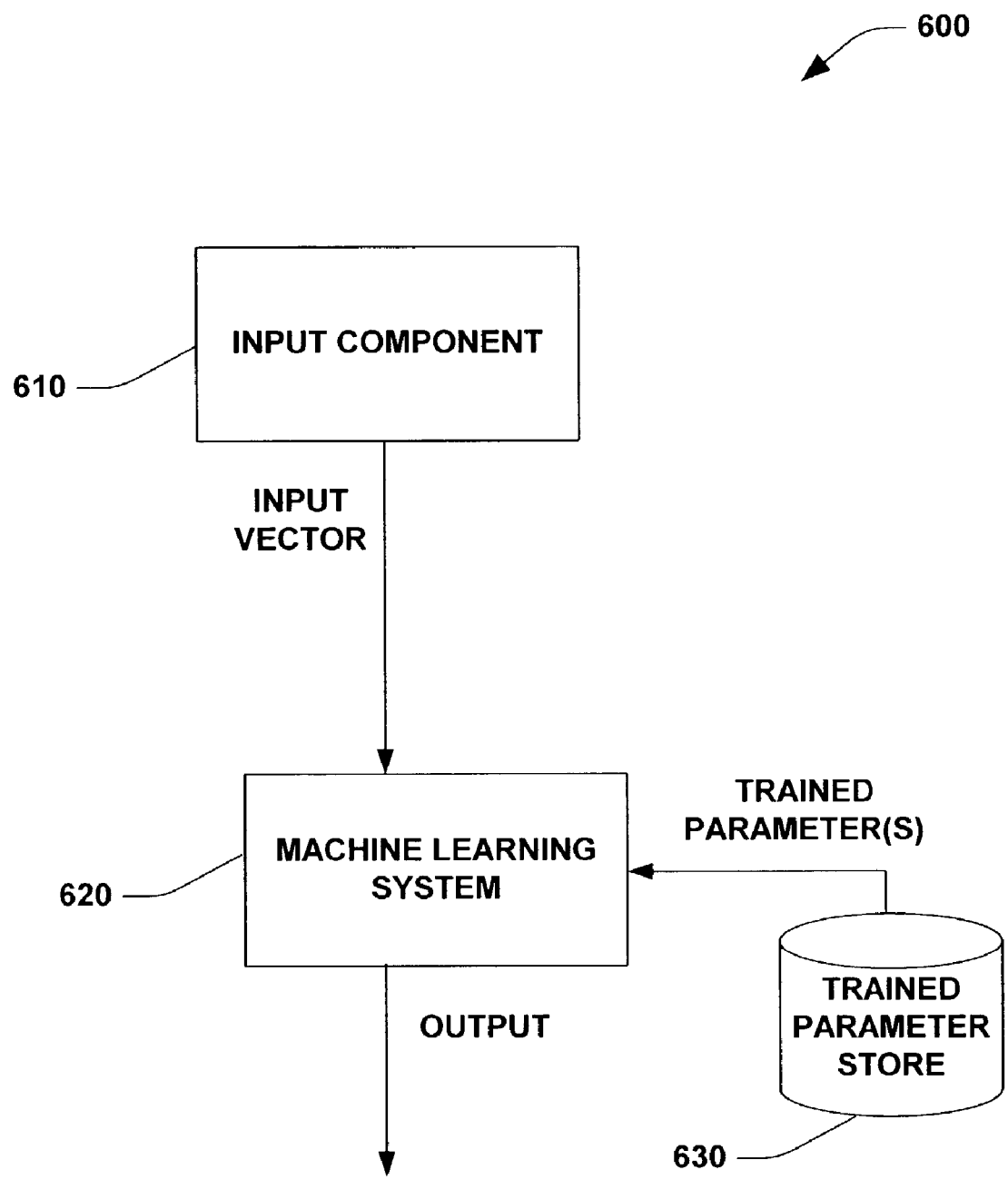
FIG. 6 is a block diagram of a machine learning system employing trained parameters in accordance with an aspect of the present invention.

Referring next to FIG. 6, a system 600 having a machine learning system employing trained parameters in accordance with an aspect of the present invention is illustrated. The system 600 includes an input component 610, a machine learning system 620 and a trained parameter store 630.

The input component 610 provides an input vector to the machine learning system 620. For example, the input vector can be based, at least in part, upon information received from a keyboard, a mouse, a speech recognition system, a tablet, a pen device, a photocopier, a document scanner, an optical character recognition system, a personal digital assistant, a fax machine and/or a tablet personal computer.

The machine learning system 620 receives the input vector from the input component 610 and, based, at least in part, upon trained parameter(s) stored in the trained parameter store 630, provides an output.

The trained parameter store 630 stores trained parameter(s) trained, at least in part, upon sequential conditional generalized iterative scaling as described above.

In view of the exemplary systems shown and described above, methodologies that may be implemented in accordance with the present invention will be better appreciated with reference to the flow chart of FIGS. 7, 8, 9 and 10. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 7:
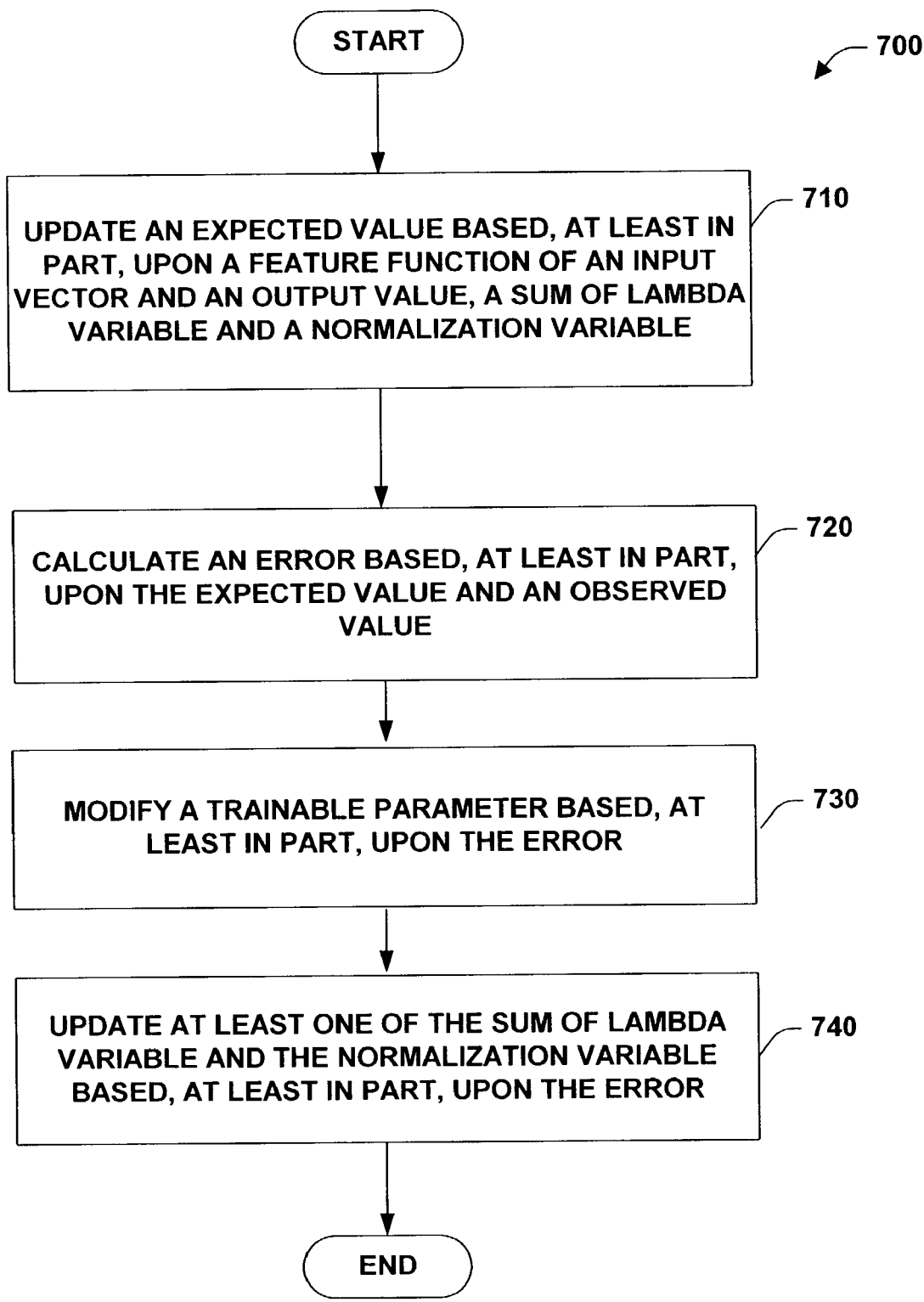
FIG. 7 is a flow chart illustrating a method for training a learning system in accordance with an aspect of the present invention.

Turning to FIG. 7, a method 700 for training a machine learning system in accordance with an aspect of the present invention is illustrated. At 710, an expected value is updated based, at least in part, upon a feature function of an input vector and an output value, a sum of lambda variable and a normalization variable (e.g., based on equation (2)). At 720, an error is calculated based, at least in part, upon the expected value and an observed value (e.g., based on equation (3)). At 730, a trainable parameter is modified based, at least in part, upon the error (e.g., based on equation (4)). At 740, the sum of lambda variable and/or the normalization variable is updated based, at least in part, upon the error (e.g., based on equations (5), (6) and/or (7)). In one example, 710, 720, 730 and 740 are performed for each feature function in order to perform an iteration of SCGIS.

Figure 8:
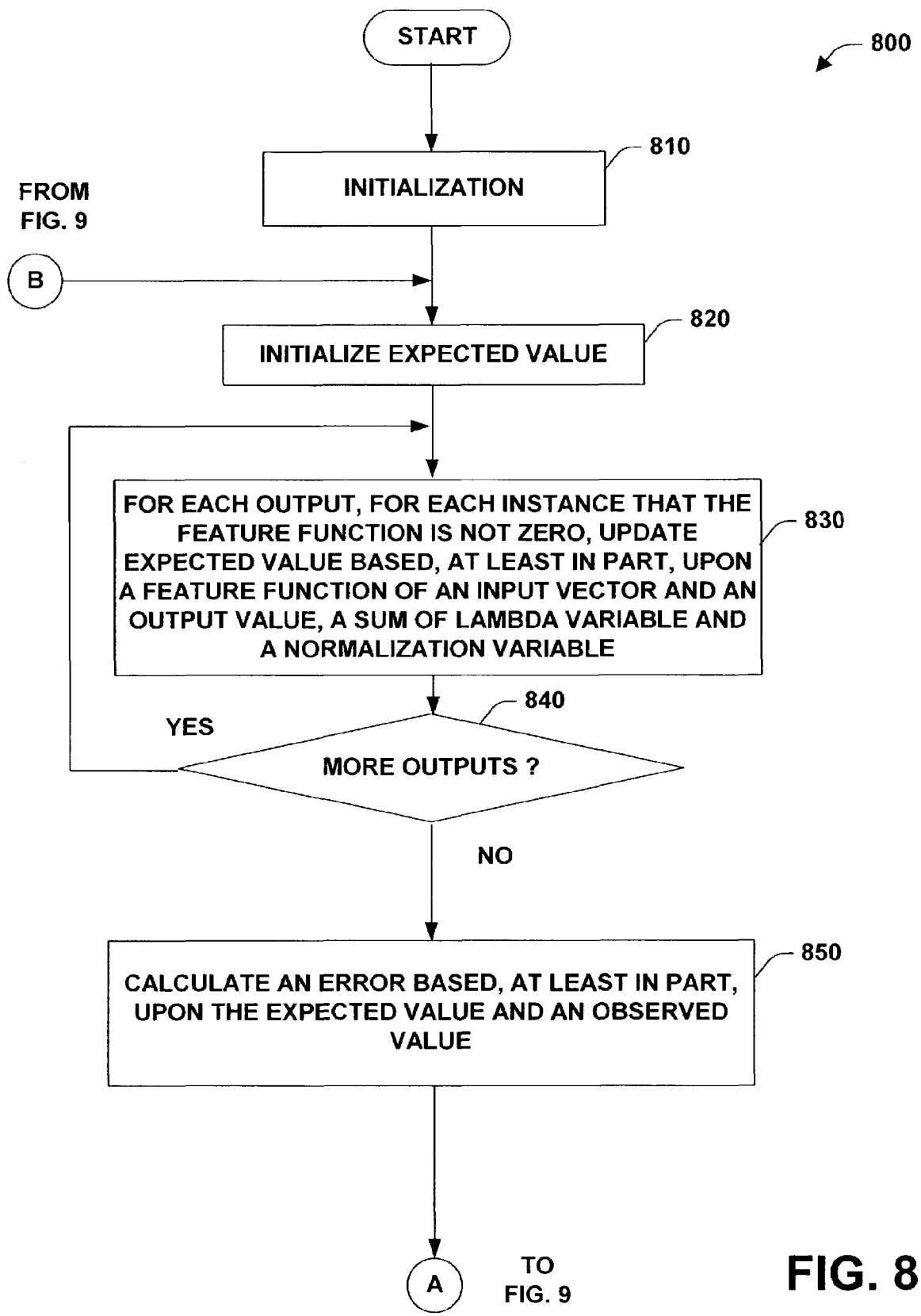
FIG. 8 is a flow chart illustrating a method for training a learning system in accordance with an aspect of the present invention.
Figure 9:
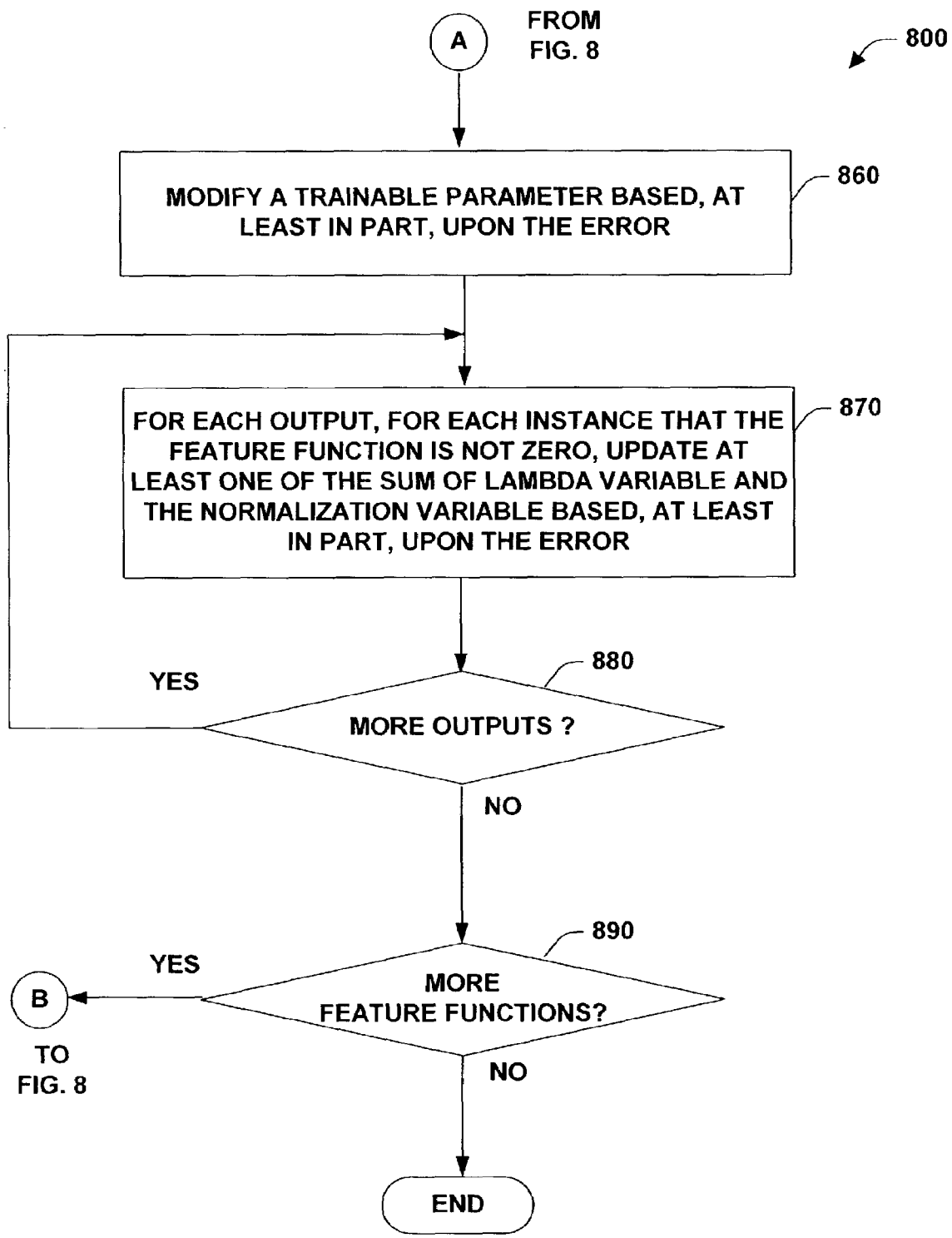
FIG. 9 is a flow chart further illustrating the method of FIG. 8.

Referring next to FIGS. 8 and 9, a method 800 for training a machine learning system in accordance with an aspect of the present invention is illustrated (e.g., based, at least in part, upon the pseudo code of Table 1). At 810, initialization is performed. For example, a set of sum of lambda variables and/or a set of normalization variables can be initialized. At 820, an expected value is initialized. Next, at 830, for each output, for each instance that the feature function is not zero, the expected value is updated based, at least in part, upon a feature function of an input vector and an output value, a sum of lambda variable and a normalization variable (e.g., based on equation (2)). At 840, a determination is made as to whether there are more outputs. If the determination at 840 is YES, processing continues at 830. If the determination at 840 is NO, at 850, an error is calculated based, at least in part, upon the expected value and an observed value (e.g., based on equation (3)). At 860, a trainable parameter is modified based, at least in part, upon the error (e.g., based on equation (4)).

At 870, for each output, for each instance that the feature function is not zero, at least one of the sum of lambda variable and the normalization variable is updated based, at least in part, upon the error (e.g., based on equations (5), (6) and/or (7)). At 880, a determination is made as to whether there are more outputs. If the determination at 880 is YES, processing continues at 870. If the determination at 880 is NO, at 890, a determination is made as to whether there are more feature functions. If the determination at 890 is YES, processing continues at 820. If the determination at 890 is NO, no further processing occurs.

In one example, 820 through 890 are performed for each feature function in order to perform an iteration of SCGIS.

Figure 10:
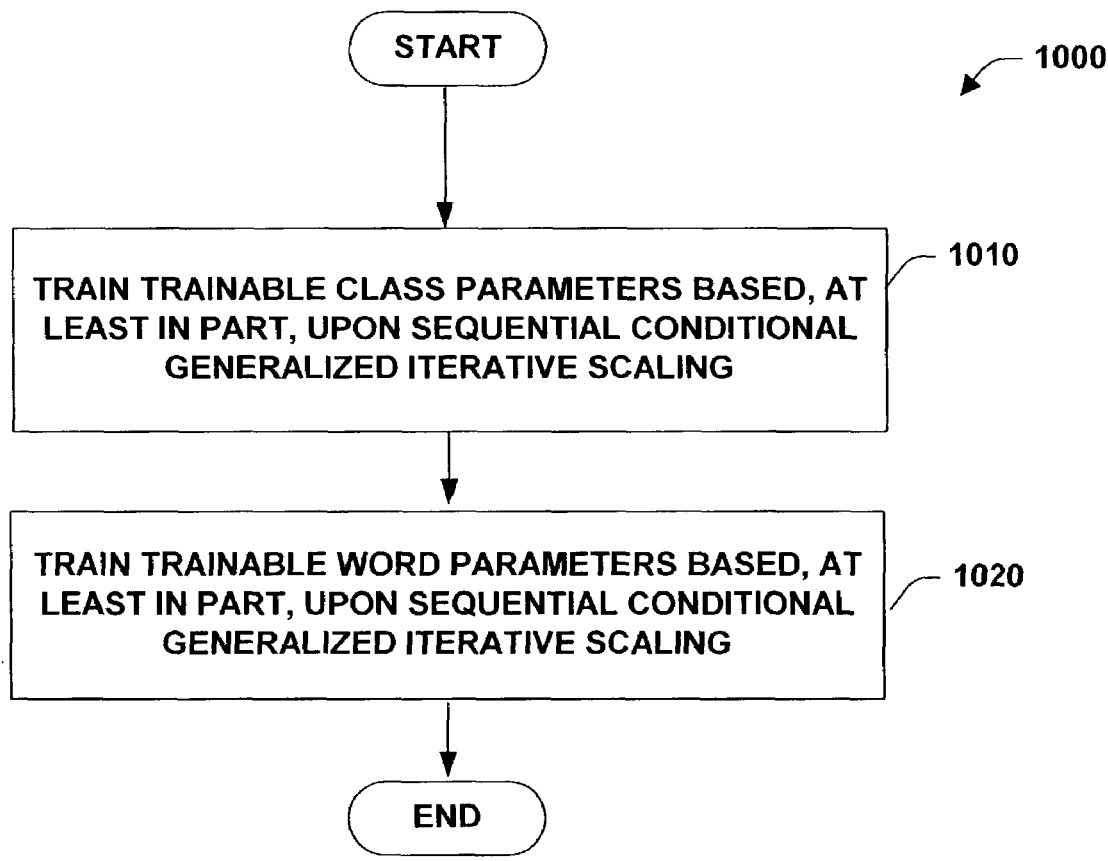
FIG. 10 is a flow chart illustrating a method for training a learning system in accordance with an aspect of the present invention.

Turning to FIG. 10, a method 1000 for training a machine learning system in accordance with an aspect of the present invention is illustrated. At 1010, trainable class parameters are trained based, at least in part, upon sequential conditional generalized iterative scaling. At 1020, trainable word parameters are trained based, at least in part, upon sequential conditional generalized iterative scaling.

Figure 11:
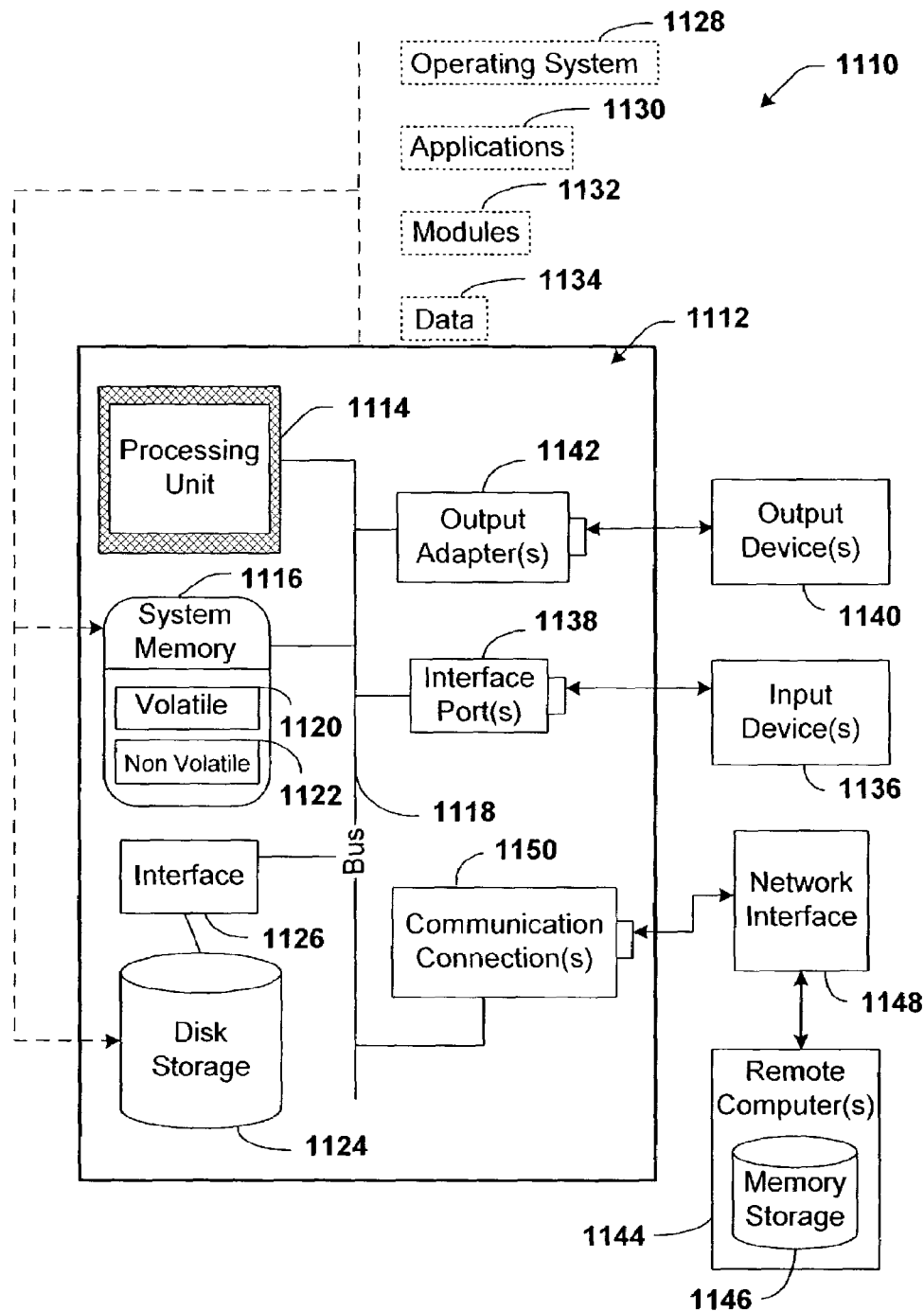
FIG. 11 illustrates an example operating environment in which the present invention may function.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for training a machine learning system, comprising:

an expected value update component that, for a plurality of outputs and for a plurality of instances in which a single feature function is non-zero, modifies an expected value based, at least in part, upon the single feature function of an input vector and an output value, a sum of lambda variable and a normalization variable;

an error calculator that calculates an error based, at least in part, upon the expected value and an observed value, the error calculation further employing, at least in part, the following equation:

$$\text{observed value}[i] = \sum_{j,y} P_{\overline{\lambda}}(\overline{x}_j, y) \times f_i(\overline{x}_j, y) \times \exp(\delta_i f_i(\overline{x}_j, y))$$

where
observed value [i] is number of times the feature function is observed,
$\overline{\lambda}$ is a trainable parameter vector,
$\delta_i$ is the error,
$P_{80}(\overline{x}_j, y)$ is a probability model,
$f_i(\overline{x}_j, y)$ is the feature function,
$\overline{x}_j$ is the input vector,
i is an instance of the feature function,
j is a training instance, and,
y is the output value;

a parameter update component that modifies a trainable parameter based, at least in part, upon the error; and, a variable update component that, for the plurality of outputs and for the plurality of instances in which the feature function is non-zero, sequentially updates at least one of the sum of lambda variable and the normalization variable based, at least in part, upon the error.

2. The system of claim 1, the error calculation further employing, at least in part, the following equation:

$$\text{observed value}[i] = \text{expected value}[i] \times e^{\delta_i \max_{i,y} f^\#(\overline{x}_j, y)} + \frac{\lambda_i + \delta_i}{\sigma^2}$$

where $\lambda_i$ is the trainable parameter,
expected value [i] is number of times the feature function is expected,
$\delta_i$ is the error,
$\sigma$ is a standard deviation,
i is an instance of the feature function,
j is a training instance,
$f_i(\overline{x}_j, y)$ is the feature function,
$\overline{x}_j$ is the input vector, and,
y is the output value.

3. The system of claim 1, modification of the expected value being based, at least in part, upon the following equation:

$$\text{expected value} = \text{expected value} + f_i(\overline{x}_j, y)e^{s[j,y]}/z[j]$$

where $f_i(\overline{x}_j, y)$ is the feature function,
$\overline{x}_j$ is the input vector,
y is the output value,
s[j,y] is the sum of lambda variable, and,
z[j] is the normalization variable.

4. The system of claim 1, the error being based, at least in part, upon the following equation:

$$\delta_i = \frac{1}{\max_{j,y} f_i(\overline{x}_j, y)} \log(\text{observed value}[i]/\text{expected value}[i])$$

where $f_i(\overline{x}_j, y)$ is the feature function,
δhd i is the error,
$\overline{x}_j$ is the input vector, and,
y is the output value.

5. The system of claim 1, modification of the trainable parameter being based, at least in part, upon the following equation:

$$\lambda_i = \lambda_i + \delta_i$$

where $\lambda_i$ is the trainable parameter, and,
$\delta_i$ is the error.

6. The system of claim 1, updating of the sum of lambda variable and the normalization variable being based, at least in part, upon the following equations:

$$z[j] = z[j] - e^{s[j,y]}$$

$$s[j,y] = s[j,y] + \delta_i$$

$$z[j] = z[j] + e^{s[j,y]}$$

where s[j,y] is the sum of lambda variable,
z[j] is the normalization variable, and,
$\delta_i$ is the error.

7. The system of claim 1, further comprising a training data store that stores at least one of the observed value and the input vector.

8. The system of claim 7, at least one of the observed value and the input vector being stored in a sparse representation.

9. The system of claim 1, further comprising a parameter store that stores at least one trainable parameter.

10. A machine learning system trained using the system of claim 1.

11. A system for training a machine learning system, comprising:
an expected value update component that, for a plurality of outputs and for a plurality of instances in which a single feature function is non-zero, modifies an expected value based, at least in part, upon the single feature function of an input vector and an output value, a sum of lambda variable and a normalization variable, modification of the expected value being based, at least in part, upon the following equation:

$$\text{expected value} = \text{expected value} + f_i(\overline{x}_j, y)e^{s[j,y]}/z[j]$$

where $f_i(\overline{x}_j, y)$ is the feature function,
$\overline{x}_j$ is the input vector,
y is the output value,
s[j,y] is the sum of lambda variable, and,
z[j] is the normalization variable;

an error calculator that calculates an error based, at least in part, upon the expected value and an observed value;
a parameter update component that modifies class trainable parameters or word trainable parameters based, at least in part, upon the error; and,
a variable update component that, for the plurality of outputs and for the plurality of instances in which the feature function is non-zero, sequentially updates at least one of the sum of lambda variable and the normalization variable based, at least in part, upon the error.

12. The system of claim 11, the class trainable parameters being trained before the word trainable parameters are trained.

13. The system of claim 11, further comprising a training data store that stores at least one of the observed value and the input vector.

14. A method for training a machine learning system, comprising:
for each feature function, updating an expected value based, at least in part, upon a feature function of an input vector and an output value, a sum of lambda variable and a normalization variable;
for each feature function, calculating an error based, at least in part, upon the expected value and an observed value, the error calculation being based, at least in part, upon the following equation:

$$\delta_i = \frac{1}{\max_{j,y} f_i(\overline{x}_j, y)} \log(\text{observed value}[i]/\text{expected value}[i])$$

where $f_i(\overline{x}_j, y)$ is the feature function,
observed value [i] is number of times the feature function is observed,
expected value [i] is number of times the feature function is expected,
δhd i is the error,
$\overline{x}_j$ is the input vector, and,
y is the output value;
for each feature function, modifying a trainable parameter based, at least in part, upon the error; and,
for each feature function, updating at least one of the sum of lambda variable and the normalization variable based, at least in part, upon the error.

15. The method of claim 14, further comprising at least one of word clustering, smoothing and improved iterative scaling.

16. A method for training a machine learning system, comprising:
updating an expected value based, at least in part, upon a feature function of an input vector and an output value, a sum of lambda variable and a normalization variable, for each output, for each instance that the feature function is not zero;
calculating an error based, at least in part, upon the expected value and an observed value, the error calculation further employing, at least in part, the following equation:

$$\text{observed value}[i] = \sum_{j,y} P_{\overline{x}}(\overline{x}_j, y) \times f_i(\overline{x}_j, y) \times \exp(\delta_i f_i(\overline{x}_j, y))$$

where observed value [i] is number of times the feature function is observed, $\overline{\lambda}$ is a trainable parameter vector, $\delta_i$ is the error, $P_{80}(\overline{x}_j, y)$ is a probability model, $f_i(\overline{x}_j, y)$ is the feature function, $\overline{x}_j$ is the input vector, i is an instance of the feature function, j is a training instance, and, y is the output value;

modifying a trainable parameter based, at least in part, upon the error; and, updating at least one of the sum of lambda variable and the normalization variable based, at least in part, upon the error, for each output, for each instance that the feature function is not zero.

17. The method of claim 16, further comprising at least one of the following acts:

performing general initialization;

resetting an expected value;

determining whether there are more outputs; and, determining whether there are more feature functions.

18. A computer implemented method for training a learning system, comprising the following computer executable acts:

training trainable class parameters based, at least in part, upon sequential conditional generalized iterative scaling an input vector, an output value, and calculating an error employing, at least in part, the following equation:

$$\text{observed value}[i] = \sum_{j,y} P_{\overline{\lambda}}(\overline{x}_j, y) \times f_i(\overline{x}_j, y) \times \exp(\delta_i f_i(\overline{x}_j, y))$$

where observed value [i] is number of times the feature function is observed, $\overline{\lambda}$ is a trainable parameter vector, $\delta_i$ is the error, $P_{80}(\overline{x}_j, y)$ is a probability model, $f_i(\overline{x}_j, y)$ is the feature function, $\overline{x}_j$ is the input vector, i is an instance of the feature function, j is a training instance, and, y is the output value;

training trainable word parameters based, at least in part, upon sequential conditional generalized iterative scaling.

19. A computer readable medium storing computer executable components of a system facilitating training of a machine learning system, comprising:

an expected value update component that modifies an expected value for a plurality of outputs and for a plurality of instances in which a single feature function is non-zero based, at least in part, upon the single feature function of an input vector and an output value, a sum of lambda variable and a normalization variable;

an error calculator component that calculates an error based, at least in part, upon the expected value and an observed value;

a parameter update component that modifies a trainable parameter based, at least in part, upon the error; and, a variable update component that sequentially updates at least one of the sum of lambda variable and the normalization variable for the plurality of outputs and for the plurality of instances in which the feature function is non-zero based, at least in part, upon the error, the updating of the sum of lambda variable and the normalization variable being based, at least in part, upon the following equations:

$$z[j]=z[j]-e^{s[j,y]}$$

$$s[j,y]=s[j,y]+\delta_i$$

$$z[j]=z[j]+e^{s[j,y]}$$

where s[j,y] is the sum of lambda variable, z[j] is the normalization variable, and, $\delta_i$ is the error.

20. A training system for a machine learning system, comprising:

means for modifying an expected value for a plurality of outputs and for a plurality of instances in which a feature function is non-zero based, at least in part, upon the feature function of an input vector and an output value, a sum of lambda variable and a normalization variable;

means for calculating an error based, at least in part, upon the expected value and an observed value, the means for error calculation further employing, at least in part, the following equation:

$$\text{observed value}[i] = \sum_{j,y} P_{\overline{\lambda}}(\overline{x}_j, y) \times f_i(\overline{x}_j, y) \times \exp(\delta_i f_i(\overline{x}_j, y))$$

where observed value [i] is number of times the feature function is observed, $\overline{\lambda}$ is a trainable parameter vector, $\delta_i$ is the error, $P_{80}(\overline{x}_j, y)$ is a probability model, $f_i(\overline{x}_j, y)$ is the feature function, $\overline{x}_j$ is the input vector, i is an instance of the feature function, j is a training instance, and, y is the output value;

means for modifying a trainable parameter based, at least in part, upon the error; and, means for updating at least one of the sum of lambda variable and the normalization variable for the plurality of outputs and for the plurality of instances in which the feature function is non-zero based, at least in part, upon the error.

* * * * *